United States Patent
Evans et al.

(10) Patent No.: US 7,370,062 B2
(45) Date of Patent: May 6, 2008

(54) SQL PREDICATE MIGRATION

(75) Inventors: Christopher Evans, Bristol (GB); Paolo Fragapane, Bristol (GB); Stephen Cave, Gloucester (GB); James Steadman, Bath (GB); Andrew Osborn, Bristol (GB); Kathryn Nash, Ledbury (GB)

(73) Assignee: Oracle International Corporation, Redwood Shores, CA (US)

( * ) Notice: Subject to any disclaimer, the term of this patent is extended or adjusted under 35 U.S.C. 154(b) by 58 days.

(21) Appl. No.: 10/673,394

(22) Filed: Sep. 30, 2003

(65) Prior Publication Data

US 2004/0220928 A1 Nov. 4, 2004

(30) Foreign Application Priority Data

Apr. 30, 2003 (GB) ................................ 0309971.0

(51) Int. Cl.
*G06F 17/30* (2006.01)
(52) U.S. Cl. ........................... 707/104.1; 707/2; 707/3; 707/4; 707/101
(58) Field of Classification Search .................... 707/2, 707/3, 5, 104.1, 4, 101
See application file for complete search history.

(56) References Cited

U.S. PATENT DOCUMENTS

| | | | |
|---|---|---|---|
| 5,367,675 A * | 11/1994 | Cheng et al. .................. | 707/2 |
| 5,499,359 A | 3/1996 | Vijaykumar | |
| 5,701,460 A | 12/1997 | Kaplan et al. | |
| 5,761,654 A * | 6/1998 | Tow ............................. | 707/2 |
| 5,963,933 A * | 10/1999 | Cheng et al. .................. | 707/2 |
| 6,112,198 A * | 8/2000 | Lohman et al. ................ | 707/3 |
| 6,477,525 B1 * | 11/2002 | Bello et al. .................... | 707/3 |
| 6,496,819 B1 * | 12/2002 | Bello et al. .................... | 707/3 |
| 6,578,028 B2 * | 6/2003 | Egilsson et al. ............... | 707/2 |
| 6,801,914 B2 * | 10/2004 | Barga et al. ................... | 707/10 |
| 7,152,073 B2 * | 12/2006 | Gudbjartsson et al. ...... | 707/102 |
| 7,222,131 B1 * | 5/2007 | Grewal et al. ........... | 707/104.1 |
| 7,283,995 B2 * | 10/2007 | Miller ........................... | 707/3 |
| 2001/0013030 A1 | 8/2001 | Colby et al. | |

OTHER PUBLICATIONS

Efficient SELECT Statements—http://publib.boulder.ibm.com/infocenter/db2help/index.jsp?topic=/com.ibm.db2.udb.doc/admin/c0005283.htm; Accessed Jan. 15, 2004.
SQL Tuning Tips—http://www.wisc.edu/dermt/oratips/sess006.html; (Accessed Jan. 30, 2004) Mar. 31, 1998.

* cited by examiner

*Primary Examiner*—Jean M. Corrielus
(74) *Attorney, Agent, or Firm*—Bingham McCutchen LLP

(57) ABSTRACT

A method of rewriting a Structured Query Language (SQL) statement in order to prevent processing of a join between a master table and a detail table in a database is disclosed. The method includes determining in the SQL statement a unique identifier to a row of the master table. The unique identifier is then equated to an identifier to related rows of the detail table using the join condition. A revised SQL statement may then be produced that only refers to the detail table using the identifier to the rows of the detail table. Subsequently, the revised SQL statement is processed.

7 Claims, 2 Drawing Sheets

PRIOR ART

EMP

Figure 2:
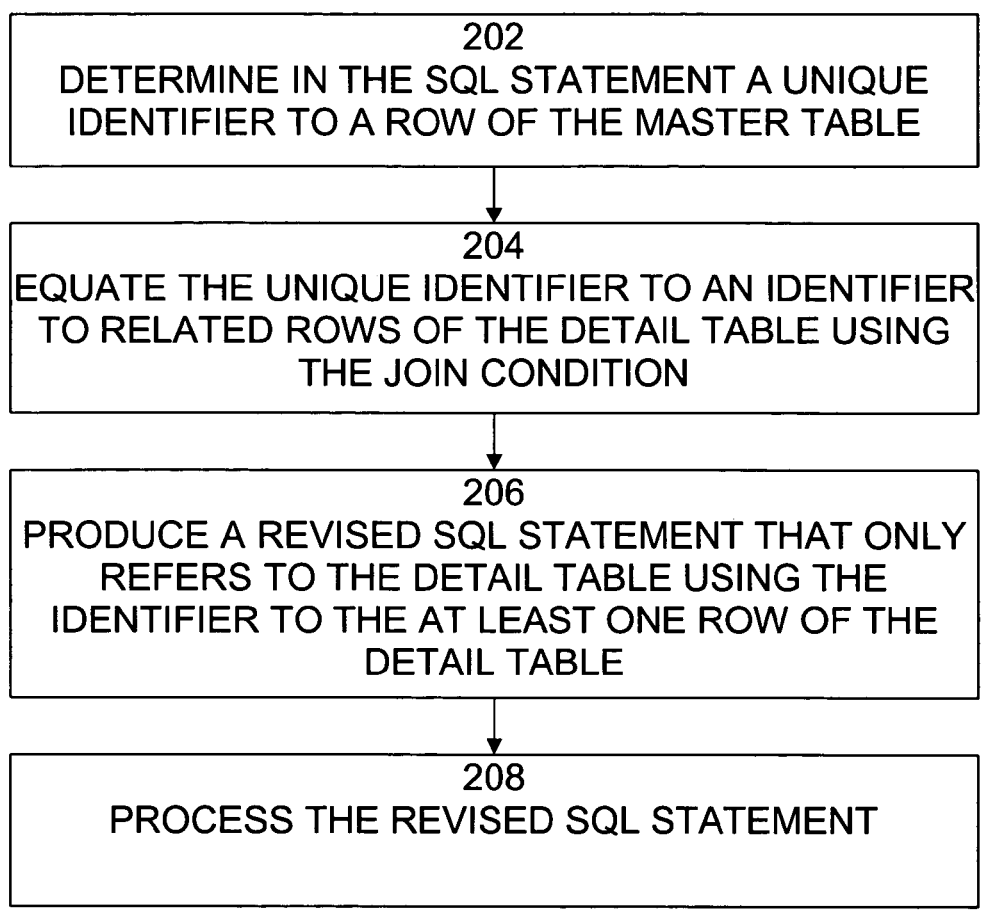

| ENAME | DEPTNO |
|---|---|
| CHRIS | 10 |
| STEVE | 10 |
| PAUL | 20 |
| JOHN | 30 |

DEPT

| DEPTNO | DNAME |
|---|---|
| 10 | R & D |
| 20 | SALES |
| 30 | ACCOUNTS |

Figure 1

SQL PREDICATE MIGRATION

BACKGROUND OF THE INVENTION (1) Field of the Invention

This invention relates to a method of preventing unnecessary joins between tables in a database from being executed and, in particular, to a method for automatically rewriting SQL statements to achieve this.

(2) Description of Related Art

The concept of a join between tables in a database is well known. A simple example will be described here with reference to FIG. 1. This shows two tables with the names EMP and DEPT. The first table EMP lists the names of the employees of a company under the column ENAME and the number of the department for which they work under the column DEPTNO. The table DEPT has a similar column named DEPTNO in which each department number is only listed once and adjacent to this is a column entitled DNAME giving the names of the respective departments. It can be seen that a many to one relationship exists between the tables EMP and DEPT via their respective DEPTNO columns. That is to say that each value appears only once under the DEPTNO column of DEPT but can appear many times under the corresponding column of EMP. In this context, table EMP is referred to as the detail table and table DEPT is referred to as the master table.

In the table DEPT, the column DEPTNO has values that are unique in each row and this column is referred to as the primary key of the table. This primary key is typically indexed allowing fast access to each row. In table EMP, the column DEPTNO is referred to as the foreign key. This is not necessarily an indexed column although typically it is.

If it were desired to extract the names of the employees and their respective department names, then typically, a view would be defined as follows: SELECT ENAME, DNAME FROM EMP, DEPT
   WHERE EMP.DEPTNO=DEPT.DEPTNO This view may be known as EMPDEPT. Then, an SQL statement may refer to this view EMPDEPT such as:
   SELECT ENAME, DNAME FROM EMPDEPT This statement requires the join to be executed in order to extract the required data from both tables. However, there are instances in which it is not necessary to execute the join in order to extract the required data but nevertheless, the database still executes the join. Clearly, it is desirable to provide a method in which this unnecessary execution of joins can be prevented.

BRIEF SUMMARY OF THE INVENTION

In accordance with a first aspect of the present invention, there is provided a method of rewriting a Structured Query Language (SQL) statement in order to prevent processing of a join between a master table and a detail table in a database, the join having a join condition, the method comprising the steps of:
   a. determining in the SQL statement a unique identifier to a row of the master table;
   b. equating the unique identifier to an identifier to related rows of the detail table using the join condition;
   c. producing a revised SQL statement that only refers to the detail table using the identifier to the at least one row of the detail table; and,
   d. processing the revised SQL statement.

Hence, the invention provides a method for rewriting SQL statements which refer to two tables such that the correct data can be retrieved without executing the join if that data is contained in only one of the tables.

The unique identifier to a row of the master table may be indexed. In this case, the unique identifier to a row of the master table may be a primary key.

The identifier to at least one row of the detailed table may be a foreign key.

Typically, the join condition is an equality between a column of the master table and a column of the detail table.

The invention will typically be provided as a computer program comprising computer program code means adapted to perform the steps of the first aspect of the invention when said program is run on a computer.

Further, there may be provided a computer program product comprising program code means stored on a computer readable medium for performing a method according to the first aspect of the invention when said program product is run on a computer.

BRIEF DESCRIPTION OF THE SEVERAL VIEWS OF THE DRAWING(S)

An embodiment of the invention will now be described with reference to the accompanying drawing, FIG. 1 which shows two tables in a database.

FIG. 2 which shows a process according to the present invention.

DETAILED DESCRIPTION OF THE INVENTION

The embodiment of the invention is best described with reference to an example SQL statement, such as:
   SELECT ENAME FROM EMPDEPT
   WHERE DNAME="R&D"

This refers to the view EMPDEPT defined as:
   SELECT ENAME, DNAME, DEPT.DEPTNO FROM EMP, DEPT
   WHERE EMP.DEPTNO=DEPT.DEPTNO Since the SQL statement refers to both of the tables shown in FIG. 1, the join between them, as defined in view EMPDEPT, will be executed by the database and there is an attendant cost in processing speed due to this. However, with this SQL statement it is not, in fact, necessary to execute the join if the statement is rewritten in advance. The method of the invention, shown in FIG. 2, performs this automatically.

The SQL statement may be either entered manually or using a graphical user interface but, in this example, we will assume that it is being entered manually.

The first step 202 in the method is to determine in the SQL statement a unique identifier to a row of the master table. In this instance, the master table is DEPT and table EMP is the detailed table.

In this case, since the SQL statement is attempting to retrieve the data and the column ENAME in table EMP only where the corresponding DNAME value equals "R&D" then the SQL statement can be rewritten to refer to the primary key of table DEPT as follows:
   SELECT ENAME FROM EMPDEPT WHERE DEPTNO=10

In fact, this change will normally speed up the processing of the SQL statement since the primary key is typically indexed thereby allowing fast access to the rows of the table via column DEPTNO.

This SQL statement can then be combined with the definition of the view EMPDEPT to produce an SQL statement as shown:

SELECT ENAME FROM EMP, DEPT
WHERE EMP.DEPTNO=DEPT.DEPTNO
AND DEPT.DEPTNO=10

The next step 204 in the method is to equate the unique identifier to a row of the master table to an identifier to related rows of the detail table using the join condition. In this case, the join condition is that EMP.DEPTNO=DEPT.DEPTNO and so the above SQL statement can be reduced 206 to:

SELECT ENAME FROM EMP WHERE EMP.DEPTNO=10

As can be seen, this new statement only refers to the detailed table, the join being eliminated and instead of filtering the results using a value from the DEPT table, the predicate has been migrated using the join condition to the equivalent predicate related to the EMP table. As a result, the new SQL statement no longer refers to the DEPT table.

This new SQL statement can then be processed 208 by the database and will be executed more quickly than the original SQL statement due to elimination of the join.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of a particular type of signal bearing media actually used to carry out distribution. Examples of computer readable media include recordable type media, such as floppy disks, a hard disk drive, RAM and CD-ROMs as well as transmission-type media such as digital and analogue communications links.

We claim:

1. A computer-implemented method of rewriting a Structure Query Language (SQL) statement in order to prevent any processing of a join between a master table and a detail table in a database, the join having a join condition, the method comprising the steps of: determining in the SQL statement a unique identifier to a row of the master table; equating the unique identifier to an identifier to related rows of the detail table using the join condition; producing a revised SQL statement that only refers to the detail table using the identifier to the at least one row of the detail table, wherein the revised SQL statement does not include the join; and, processing the revised SQL statement that only refers to the detail table, instead of the SQL statement that includes the join.

2. A method according to claim 1, wherein the unique identifier to a row of the master table is indexed.

3. A method according to claim 2, wherein the unique identifier to a row of the master table is a primary key.

4. A method according to claim 1, wherein the identifier to at least one row of the detail table is a foreign key.

5. A method according to claim 1, wherein the join condition is an equality between a column of the master table and a column of the detail table.

6. A computer program comprising computer program code means adapted to perform the steps of claim 1 when said program is run on a computer.

7. A computer program product comprising program code means stored on a computer readable medium for performing the method of claim 1 when said program is run on a computer.

* * * * *